March 28, 1967     F. L. ERHARDT     3,311,398
RETRACTABLE FISHING GAFF
Filed Aug. 9, 1965     2 Sheets-Sheet 1
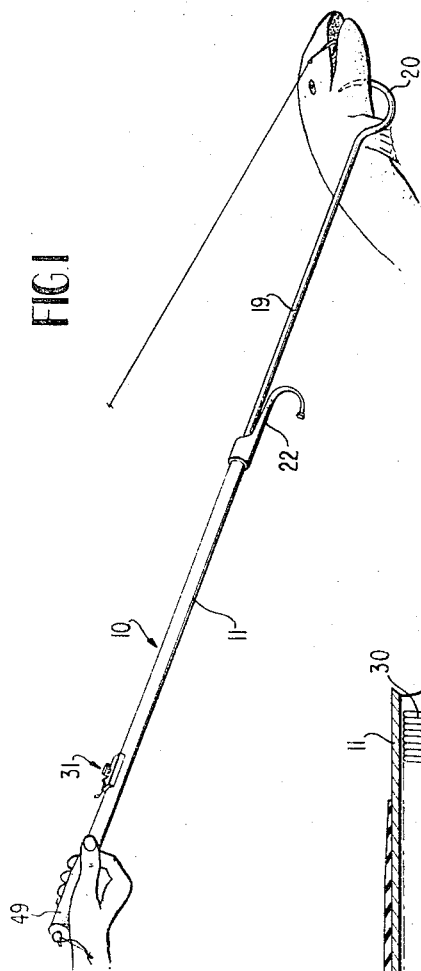
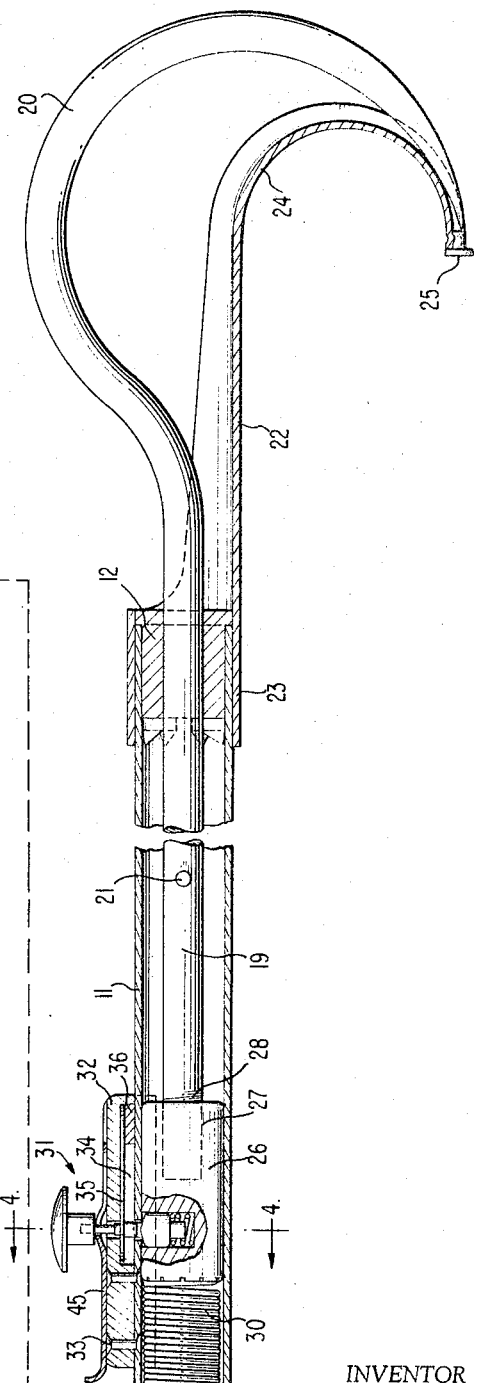
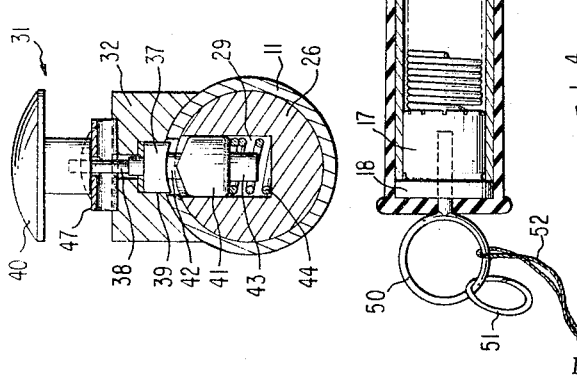
INVENTOR
FRED L. ERHARDT
BY *Dennison & Dennison*
ATTORNEYS March 28, 1967     F. L. ERHARDT     3,311,398
RETRACTABLE FISHING GAFF
Filed Aug. 9, 1965     2 Sheets-Sheet 2
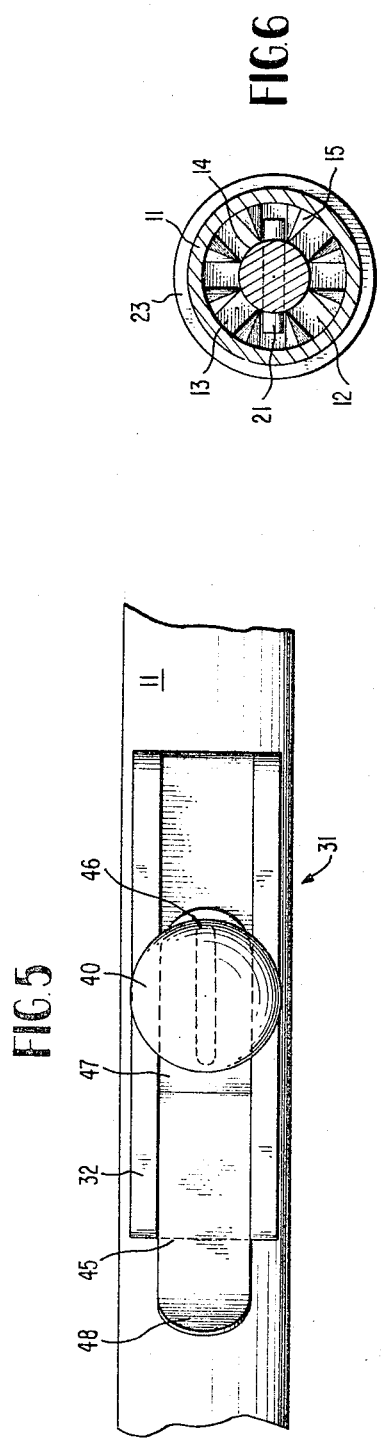
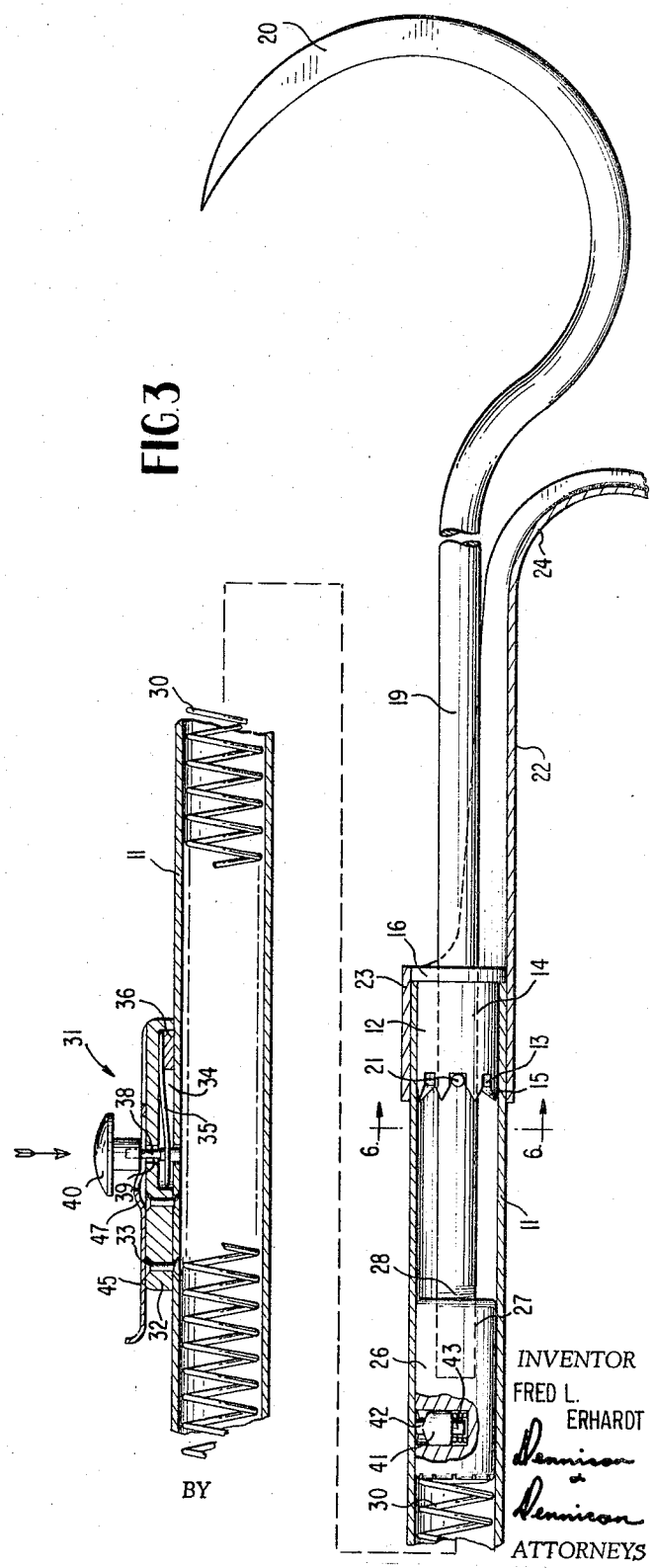
INVENTOR
FRED L. ERHARDT
BY
ATTORNEYS United States Patent Office 3,311,398
Patented Mar. 28, 1967

3,311,398
RETRACTABLE FISHING GAFF
Fred L. Erhardt, 438 Highland Ave.,
Clifton, N.J. 07732
Filed Aug. 9, 1965, Ser. No. 478,048
6 Claims. (Cl. 294—19)

This invention relates to new and useful improvements in apparatus for aiding in the landing of fish and the like. More particularly, the invention relates to a gaff hook of the retractable type having various new safety features.

Gaff hooks previously in use were cumbersome and presented a hazard to the user by virtue of the relatively sharp point employed. Attempts had been made to provide retractable gaff hooks having scabbard devices or other safety features for the point, but in most cases, the safety features provided created new problems in regard to rotation of the components during use and in various complex means designed to eject or extend the gaff hook in use.

The present invention overcomes the difficulties inherent in the prior art and provides apparatus which will enable fishermen to use a gaff hook in an effective and quick manner with safety.

An object of the present invention is to provide a gaff hook assembly having a retractable hook portion.

Another important object of this invention is to provide a retractable gaff assembly having safety means to protect the hook point when in a non-use position.

A still further object of the instant invention is to provide a fishing gaff embodying a spring-actuated, trigger-controlled ejection means for extending the gaff hook.

Another object of this invention is the provision of latch means associated with a trigger mechanism to retain the gaff hook in its safe non-use position.

A further object of this invention is to provide a retractable gaff hook which when extended to operative position will be held rigidly and locked against turning of the hook assembly within its handle.

A further object of this invention is to provide a retractable fishing gaff assembly which is of simple construction, has a minimum number of parts, is inexpensive to manufacture, and is safe and efficient in use.

For yet other objects and for a better understanding of the invention, reference may be had to the following detailed description taken in conjunction with the accompanying drawings which illustrate the best mode now contemplated by me for carrying out my invention:

FIG. 1 is a perspective view of the fishing gaff in extended use position;

FIG. 2 is an enlarged fragmentary and partly sectional view of the gaff in its retracted position;

FIG. 3 is an enlarged fragmentary and partly sectional view of the gaff in its extended operative position;

FIG. 4 is an enlarged cross section of a portion of the gaff trigger assembly taken along lines 4—4 of FIG. 2;

FIG. 5 is an enlarged fragmentary plan view taken in the direction of the arrow in FIG. 3; and FIG. 6 is an enlarged sectional view taken along line 6—6 of FIG. 3.

Reference is now made more specifically to the drawings, wherein like reference numerals designate similar parts throughout the several views and wherein the gaff hook assembly constituting the subject matter of this invention is designated generally at 10.

The main body of the gaff comprises a hollow cylindrical barrel 11 formed of metal tubing or the like which is preferably about 20 inches long. The overall length of the gaff assembly is subject to variation depending upon the final use of the device, that is, whether or not it is to be used in commercial fishing or sport fishing. The front end of barrel 11 is closed off by a front end locking plug 12. This plug is preferably press fit into the end of the barrel tubing and is held therein by friction. The plug may be fabricated from stainless steel or aluminum. An axial opening 14 is provided in the plug as later described. A plurality of cross slots 13 are milled or otherwise formed in the inner end face of locking plug 12. Beveled guide portions 15 are machined into the wall portion of the locking plug separating the cross slots 13. The function and operation of the aforesaid components will be apparent as this description proceeds. The outer end face of the locking plug is provided with an annular shoulder 16 which abuts against the end of barrel 11 as seen in FIG. 3.

The rear end of barrel 11 is closed off by a rear end locking plug 17. This plug is preferably aluminum and is also press fitted into the barrel 11 in a manner similar to the front end locking plug 12. An annular shoulder 18 is provided on the outer face of plug 17 and abuts against the edge of barrel 11 as more clearly shown in FIG. 2.

The gaff itself comprises a stainless steel rod having a shank portion 19 which passes through the axial opening 14 in the front end locking plug 12. The shank is bent into the form of a hoop 20 having a sharp pointed end. The shank locking pin 21 extends through the gaff shank portion 19 and serves as a limit stop for gaff extension. Note FIGURE 3 in this regard, wherein the shank locking pin 21 is received in a pair of cross slots 13.

In order to sheath the hook portion of the gaff when in a non-use or storage position, a hook guard assembly 22 is provided. The guard assembly comprises a hook guard sleeve 23 which is press fit over the end of the barrel 11 and annular shoulder 16 of the front end plug. The guard assembly is generally channel shaped and is preferably formed of aluminum having a bent back portion at 24. A point guard plug 25 may be crimped into the end of the hook guard assembly as shown in FIG. 2. In the retracted or non-use position of the gaff hook, the point is safely guarded in the hook guard 22 with the point protected by plug 25.

Fitted for sliding movement within the bore of barrel 11 is piston assembly 26. The piston is preferably constructed from aluminum, however, plastic or other suitable materials may be used. A tapped hole 27 is provided in the axial end face of piston 26 and receives the threaded end 28 of the gaff shank 15. A cylindrical opening 29 as shown in FIGURE 4, is provided running transverse to the axis of piston 26 for reception of the floating latch assembly as later described.

A coiled compression spring 30 is interposed within barrel 11 between the rear end locking plug 27 and the piston assembly 26. In the non-use position of FIGURE 2, it would be noted that the coil spring is completely compressed.

The components for releasing the piston and allowing the gaff hook to extend by virtue of the force imparted by coil spring 30 constitutes the firing assembly shown generally at 31 in FIGURES 1, 2, 3, 4 and 5. The assembly comprises a housing preferably formed of metal 32 which is attached to the top of the barrel 11 by means of rivets 33 or other acceptable fastener means. The bottom of the housing 32 is preferably curved as shown in FIGURE 1 to conform to the shape of barrel 11 and is provided with an undercut portion 34. A leaf spring 35, preferably bifurcated at one end, is held at its other end against the bottom of housing 32 by means of a retainer 36. See FIGURE 2 in this regard. The firing pin proper 37 is attached to the firing pin neck assembly 38 and reciprocates in a hole 39 formed in the housing 32. The bifurcated leaf spring 35 is adapted to engage a portion of the neck 38 and to normally bias the firing pin in an upward direction. The upper end of the firing pin neck 38 terminates in a push button 40.

A floating latch 41 is located within the opening 29 of the piston 26 and is provided with a projection 42 at its upper end adapted to contact the firing pin 37. A coil compression spring 44 within the opening 29 normally urges the floating latch upwardly. A downwardly extending neck 43 limits downward movement of the floating latch. It will be noted that an opening is provided at the top of the barrel 11 so that the projection 42 on the floating latch can extend thereto and effectively lock the piston assembly 26 in its rearward position as shown in FIGURE 2. In this position, as previously noted, the coil spring 30 is in its compressed condition.

For safety purposes and to provide a positive lock against accidental operation of the gaff, a slide lock member 45 is provided. An elongated opening 46 as shown in FIGURE 5 is cut into the latch 45. A deformation or hump 47 is formed in the slide lock adjacent one end of opening 46 which serves to hold the push button 40 secure from downward movement. An upturned finger portion 48 is provided at the rear end of the slide lock and serves as a grip for the forward and backward movement of the slide lock. It will be appreciated that when the slide latch is pushed forwardly, the push button is restrained from downward movement as shown in FIG. 2. A movement of the slide latch rearwardly as shown in FIG. 3 permits downward movement of push button 40 and hence, actuation of the trigger.

For ease in handling a hand grip of either rubber, plastic, or composition may be placed upon the rear end of barrel 11 as shown at 49. A tapped hook eye 50 may be provided and is secured to the end of the rear locking plug 17. A split type key ring 51 may be optionally placed on the eye 50 for purposes of hanging the same on the belt of a user and a strip of raw hide lace or string 52 may also be provided to fit over the hand of the user for purposes of preventing the gaff from being lost overboard when used in a boat.

In operation it will be assumed that the gaff is in its retracted or non-use position as shown in FIG. 2 wherein it can be handily carried about with safety. In order to extend the gaff for use, the slide lock 45 is moved rearwardly by means of the finger portion 48 and the manual push button 40 is pressed downwardly by the thumb. The firing pin 37 is located at the bottom of the push button then forces projection 42 of the floating latch 41 down into the opening 29 of the piston 26. At the instant when the top surface of projection 42 is just flush with the inner diameter of barrel 11, all positive locking is removed and the piston is free to travel forwardly under the force of the compressed coil spring 30. The push button is then automatically returned by means of spring 35. During the forward motion of the piston, both the piston and the gaff shank 19 will rotate somewhat due to the uncoiling of the coil spring 30. Movement of the gaff hook and shank in a forward direction continues until the shank locking pin 21 comes in contact with the slots 13 of the front end locking plug 12. The beveled guide portions 15 serve to move the locking pin 21 into an adjacent pair of slots 13. In practice it has been found that the rotation of the gaff point is somewhere between 90 and 180 degrees. When in the extended position, the gaff shank and hook are locked against rotation by the interengagement of the locking pin 21 and the front end locking plug 12.

Retraction of the gaff to its safety or nonuse position is accomplished by merely pushing against the curved portion 20 of the gaff hook until the floating latch projection 42 aligns itself with the hole in the upper portion of barrel 11, at which time the projection will snap through and will positively lock the piston and gaff attached thereto in retracted position. While I have shown and described a preferred embodiment of the invention, it is to be understood that the drawings and detailed disclosure are to be construed in an illustrative rather than a limiting sense since various modifications and substitutions of equivalence may be made by those skilled in the art within the spirit and scope of this invention as defined in the appended claims.

What I claim as my invention and desire to protect by Letters Patent of the United States is:

1. A fishing gaff assembly comprising an elongated barrel, a piston reciprocable within said barrel, a front locking plug having an axial opening closing the front of said barrel, a rear plug closing the rear of said barrel, a plurality of radial locking slots formed in the rear face of said front locking plug, a gaff hook having a point at one end and an elongated shank at the other end, said shank end extending through said axial opening of said front locking plug and being secured to said piston, hook sheathing means mounted on said barrel and adapted to protect said hook point when said piston is moved toward said rear plug to a non-use position, a coil compression spring within said barrel interposed between said rear plug and said piston and normally urging said piston toward said front locking plug and said hook point away from said sheathing means, a radially extending locking pin on said shank within said barrel adapted to engage within one of said locking slots when said piston is propelled forwardly under the impetus of said spring to lock said shank from rotation, lock means on said barrel and piston adapted to hold said piston in its non-use position against the force of said resilient means, and trigger means on said barrel adapted to release said lock means.

2. A fishing gaff assembly as defined in claim 1, wherein said front end locking plug is friction fit in the front end of said barrel and is provided with an annular flange abutting the front edge of said barrel.

3. A fishing gaff assembly as defined in claim 1 wherein the rear face of said front locking plug has a plurality of radial walls adjacent said slots, the sides of said walls tapering to a sharp edge at the rear face.

4. A fishing gaff assembly as defined in claim 3 and further including a handle grip telescopingly engaged about the rear end of said barrel.

5. A fishing gaff assembly as defined in claim 3, wherein said slots are arranged in aligned pairs 180 degrees apart and wherein said blocking pin passes diametrically through said shank and extends outwardly on opposite sides thereof.

6. A fishing gaff assembly comprising an elongated barrel, a piston reciprocable within said barrel, a gaff hook having a point at one end and an elongated shank at the other end, said shank end being secured to said piston for movement therewith and extending axially from one end of the barrel, hook sheathing means mounted on said barrel and adapted to protect said hook point when said piston is moved toward the other end of said barrel to a non-use position, resilient means in said barrel normally urging said piston toward said one end of the barrel and said hook point away from said hook sheathing means, cooperating lock means on said barrel and piston adapted to hold said piston in its non-use position against the force of said resilient means, said lock means comprising a recess formed in said piston transverse to the piston axis, a locking pin reciprocable within said recess, resilient means urging said pin to move radially outwardly of said piston, and a locking hole formed in the surface of said barrel and adapted to receive said locking pin, and trigger means on said barrel adapted to release said lock means, said trigger means comprising a housing secured to said barrel and having a recess formed therein aligned with said recess in said piston, a firing pin reciprocable within said housing recess adapted to engage the end of said locking pin, a push button on the free end of said firing pin, safety means selectively movable into contact with said push button to prevent movement thereof, spring means normally urging said firing pin away from said locking pin, whereby when said firing pin is forced against said locking pin, said locking pin will be moved radially inward of said piston against said resilient means in the recess and out of engagement with said locking hole and said piston will be propelled forwardly by said resilient means in said barrel.

References Cited by the Examiner

UNITED STATES PATENTS 2,319,992  5/1943  Hubbard _____ 294—19

FOREIGN PATENTS 965,699  2/1950  France.
17,868   8/1906  Great Britain.

GERALD M. FORLENZA, Primary Examiner.

G. F. ABRAHAM, Assistant Examiner.